(12) United States Patent  
Mitchell

(10) Patent No.: US 7,841,604 B2
(45) Date of Patent: Nov. 30, 2010

(54) DETACHABLE TRAILING TAG AXLE

(76) Inventor: Jack W Mitchell, 255 S. 100 East, Kamas, UT (US) 84036

( * ) Notice: Subject to any disclaimer, the term of this patent is extended or adjusted under 35 U.S.C. 154(b) by 0 days.

(21) Appl. No.: 12/185,006

(22) Filed: Aug. 1, 2008

(65) Prior Publication Data

US 2009/0322047 A1 Dec. 31, 2009

Related U.S. Application Data

(60) Provisional application No. 61/133,175, filed on Jun. 26, 2008.

(51) Int. Cl.
*B62D 61/12* (2006.01)
(52) U.S. Cl. ....................................... 280/86.5
(58) Field of Classification Search ................ 280/86.5, 280/401, 404; 180/14.1
See application file for complete search history.

(56) References Cited

U.S. PATENT DOCUMENTS

| | | | |
|---|---|---|---|
| 3,282,601 A | 11/1966 | Harbers | |
| 3,298,706 A | 1/1967 | Lyall | |
| 3,485,505 A | 12/1969 | Schmidt | |
| 3,885,808 A | 5/1975 | Derrwaldt | |
| 3,926,453 A | 12/1975 | Leslie | |
| 4,063,779 A | 12/1977 | Martin et al. | |
| 4,226,437 A | 10/1980 | Trudeau | |
| 4,423,884 A | 1/1984 | Gevers | |
| 4,783,096 A | 11/1988 | Ramsey et al. | |
| 5,163,698 A | 11/1992 | Evens | |
| 5,303,946 A | 4/1994 | Youmans et al. | |
| 5,335,958 A * | 8/1994 | Christenson et al. | .......... 296/56 |
| 5,375,866 A | 12/1994 | Wagner | |
| 5,458,355 A | 10/1995 | Young | |
| 5,516,135 A * | 5/1996 | Christenson | ............. 280/405.1 |
| 5,718,443 A | 2/1998 | St. Onge | |
| 6,224,083 B1 | 5/2001 | Tyler | |
| 6,315,311 B1 | 11/2001 | Mathiowetz | |
| 6,631,817 B1 | 10/2003 | Fleagle et al. | |
| 6,820,887 B1 | 11/2004 | Riggle | |
| 7,237,789 B1 | 7/2007 | Herman | |
| 2007/0126196 A1 * | 6/2007 | Klahn | ....................... 280/86.5 |

* cited by examiner

*Primary Examiner*—Faye M. Fleming
(74) *Attorney, Agent, or Firm*—F. Chad Copier

(57) ABSTRACT

A vehicle designed to haul loads may be provided, which may be effectively extended and load hauling capacity increased with a detachable trailing tag axle that may include a framework with a front, a rear end, an axle attached to near the rear of the framework, wheels attached to the axle, and a mechanism near the front of the framework for stabilization when the tag axle assembly is standing alone. A holding mechanism near the front of the tag axle assembly may be used to attach the tag axle assembly to a portion of the vehicle chassis, such as a receiving mechanism at the rear of the vehicle chassis.

20 Claims, 7 Drawing Sheets

DETACHABLE TRAILING TAG AXLE

RELATED APPLICATIONS

This application claims priority to U.S. provisional patent application 61/133,175, filed on Jun. 26, 2008, which is incorporated by reference herein in its entirety.

FIELD

This application relates generally to auxiliary vehicle equipment. More particularly, this application relates to trailing tag axles for load transportation vehicles such as dump trucks.

BACKGROUND

Large trucks have been used for years as an efficient way to transport large and heavy loads from one location to another over roads and bridges. To reduce the wear inflicted upon roads and bridges by the transport of such loads, government regulations limit the weight of these loads. The regulations have been based on the longitudinal distance between sets of wheels, particularly between the front and rear wheels of the vehicle. Load size can be legally increased by increasing the distance between the front and rear wheels of the vehicle. With the desire to carry the maximum possible load, trailing tag axle assemblies have been added to vehicles to legally increase load capacity by increasing the effective length of the vehicle.

Trailing tag axle assemblies previously made and currently in use are generally attached to the vehicle in a manner intended to be permanent (i.e. bolted or welded directly to the vehicle). Because these assemblies are not intended to be removed from the vehicle, the assemblies are generally made to move between a raised and lowered position, usually by the means of hydraulic actuators or similar motion inducing apparatus, to stow the assembly on the vehicle when not in use. This allows them to be lowered to an operating position when needed and raised to a storing and inactive position when not needed or, when dumping a load.

There are several disadvantages to the trailing tag axle assemblies previously used. One disadvantage is that with the trailing tag axle generally being of a non-detachable nature, it is still attached to the vehicle when not in use. Some materials hauled by vehicles use all available cubic volume in a cargo portion of the truck without maximizing the weight load that can be legally carried, thereby obviating the need for the trailing tag axle. In these situations the attached trailing axle adds unnecessary weight to the vehicle and can increase the wear on the vehicle, such as the tires, or may interfere with desired vehicle operations.

The previous tag axle assemblies can be cumbersome when disengaging a load by interfering with the operation of a tailgate or other door assembly. Many times the axle assembly is stored over the rear door of the truck body and therefore interferes with raising the gate. This is particularly true with a high-lift gate that is hinged toward the front of the dump body to raise it high over the load. This is important when large rock, riprap or the like is dumped. It can also interfere with the accuracy of placing a load by being between the vehicle and the desired unloading location (e.g. a hopper on an asphalt paving machine).

Another disadvantage of previous tag axle assemblies is that in the stored (stowed) position the tag axle assembly may cause the overall height of the vehicle to be greater than governmental regulations allow.

SUMMARY

A vehicle, such as a dump truck, panel truck, garbage hauler, container hauler, etc., may be provided with a chassis, front wheels attached to a front axle mounted near the front end of the chassis, rear wheels attached to a rear axle mounted near the rear end of the chassis, a body attached to the chassis, and a cargo support portion mounted to the chassis for carrying a load. In some embodiments, the detachable trailing tag axle could include of a framework with a front, a rear end, an axle attached to near the rear of the framework, wheels attached to the axle, and a mechanism near the front of the framework for stabilization when the tag axle assembly is standing alone. A holding mechanism near the front of the tag axle assembly may be used to attach the tag axle assembly to a portion of the vehicle chassis, such as a receiving mechanism at the rear of the vehicle chassis.

Some embodiments of the holding mechanism may include one or more engagement bodies, such as pins, hooks, etc. The engagement bodies may be configured to be releasably coupled to receiving bodies, such as holes, flanges, bars, etc., in a portion of the vehicle, such as in the body, the chassis, the cargo support, etc., by mechanical means. The holding mechanism may be driven by an actuator hydraulically, mechanically, electrically, etc., to engage the engagement bodies with the receiving bodies. In some embodiments, the holding mechanism, including drive actuator, may be located on the vehicle with the receiving bodies being located on the trailing tag axle assembly.

Similarly, in some embodiments, the detachable trailing tag axle may have a need for connections to the vehicle air, electrical, or other supply, as well as braking apparatus, and may further include shock absorption devices, or other components as required or desired to comply with ride comfort and transportation regulations.

A trailing tag axle, as described herein, may provide one or more additional axles and wheels extending from the rear of the chassis, thereby increasing the distance between the front wheels and the furthermost rear wheels, and allowing greater loads to legally be carried by the vehicle. Some embodiments may also overcome the problem of adding weight and wear to the vehicle by providing a trailing tag axle that may be easily, quickly, and/or completely detachable from the vehicle when not needed.

Similarly, some embodiments may also overcome the problem of being cumbersome and interfering with tailgate or door operations, since the trailing tag axle can be detachable and left in a convenient location until unloading is completed. Thus, it would not interfere by not being present. This may also be helpful when unloading accuracy is important (e.g. when dumping into a hopper of a paving machine).

These and other aspects of the present invention will become more fully apparent from the following description and appended claims.

BRIEF DESCRIPTION OF THE DRAWINGS

The following description can be better understood in light of Figures, in which.

Figure 1:
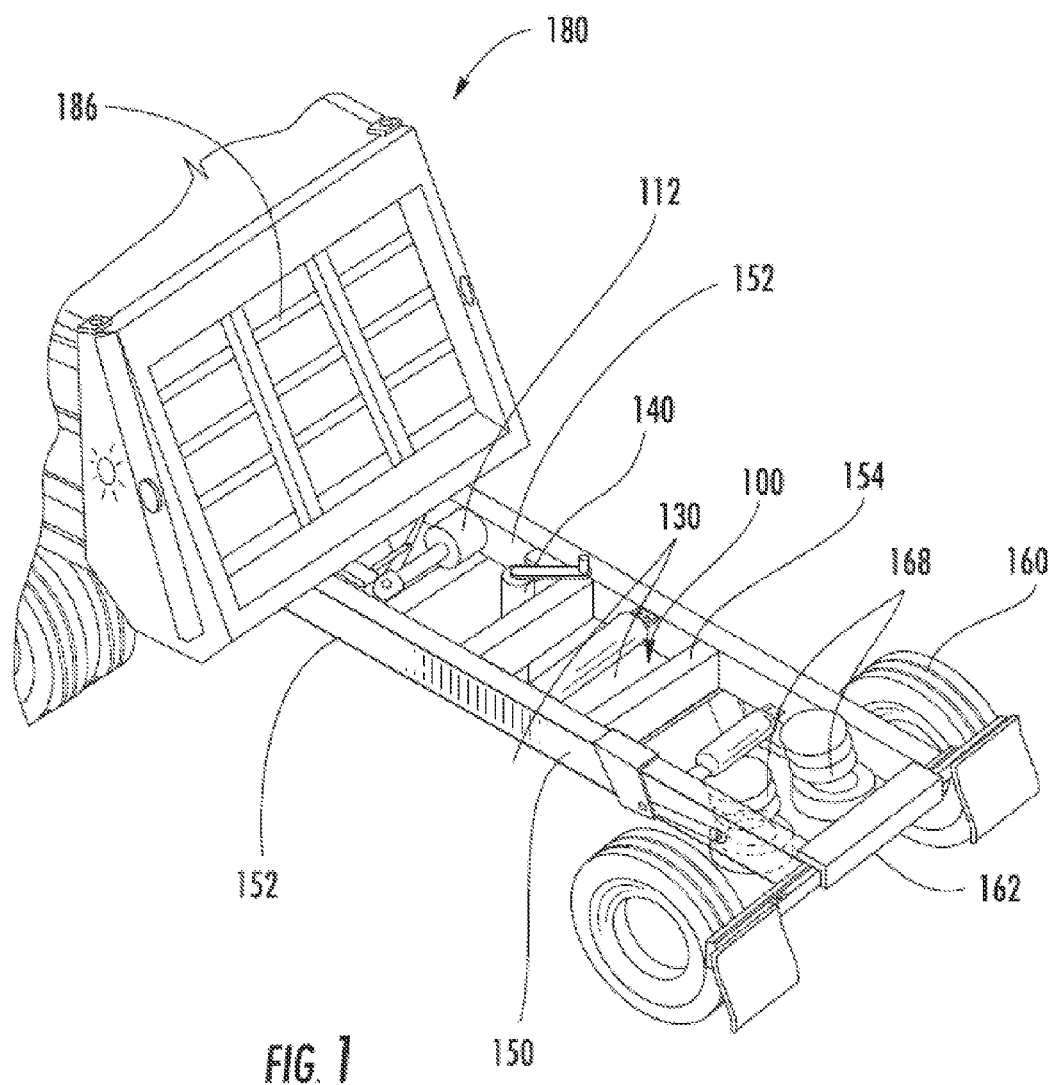
FIG. 1 is a perspective view of an exemplary embodiment of a detachable trailing tag axle attached to a vehicle.
Figure 2:
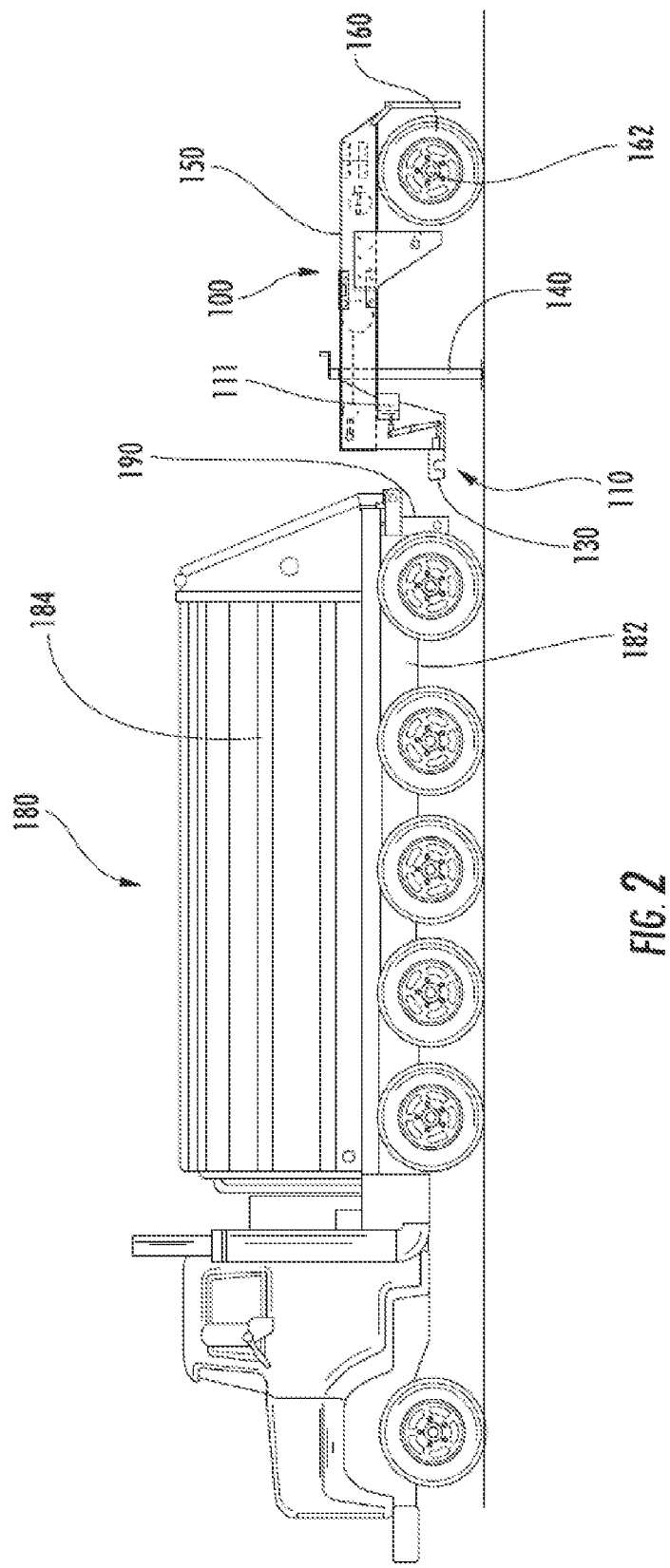
FIG. 2 is a side elevation view of an exemplary embodiment of a detachable trailing tag axle detached from a vehicle.
Figure 3:
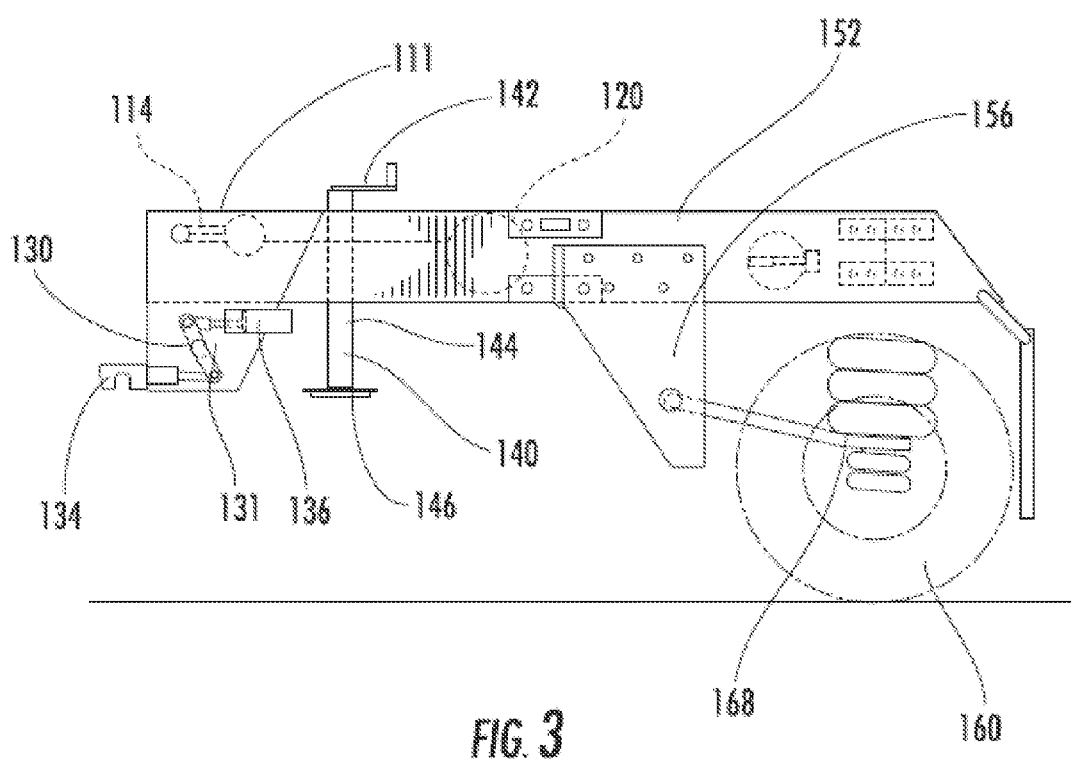
FIG. 3 is a side elevation view of an exemplary embodiment of a detachable trailing tag axle.

Together with the following description, the Figures demonstrate and explain the principles of detachable trailing tag axles and associated methods. In the Figures, the size and relative placement of components and regions of illustrated devices may be exaggerated or modified for clarity. The same reference numerals in different drawings represent the same element, and thus their descriptions may not be repeated. Some drawings may omit certain components not necessary for describing the illustrated embodiments, but which would be known to those of ordinary skill in the art to be present in a trailing tag axle.

DETAILED DESCRIPTION

As in the illustrated embodiments, aspects and features of detachable trailing tag axles and associated methods are disclosed and described below. The following description supplies specific details in order to provide a thorough understanding. Nevertheless, the skilled artisan would understand that the apparatus and associated methods of using the apparatus can be implemented and used without employing these specific details. Indeed, the devices and associated methods can be placed into practice by modifying the illustrated devices and associated methods and can be used in conjunction with any other apparatus and techniques conventionally used in the industry. For example, while this description focuses on detachable trailing tag axles for vehicles such as dump trucks, embodiments employing the principles described herein may be used on or with trailers, flat-bed trucks, panel trucks, or other load-hauling machinery, mechanisms, vehicles, devices, etc. without departing from the scope of the devices described herein.

FIG. 1 illustrates a detachable trailing tag axle 100 attached to vehicle 180. Trailing tag axle 100 may include frame 150, with longitudinal members 152 and cross members 154, supported by wheels 160 and suspension system 168. Vehicle 180 may be any vehicle that may be aided by effective extension of the wheelbase to accommodate increased loading, such as a dumptruck illustrated in the Figures. Vehicle 180 may include tailgate 186 to allow for off-loading of a load in vehicle 180.

Referring generally to FIGS. 1-6, an exemplary embodiment of trailing tag axle 100 may include frame 150, tag axle attachment assembly 110, including pin attachment assembly 111 and compensator assembly 130, and wheels 160. Vehicle 180 may be any vehicle that may be aided by effective extension of the wheelbase to accommodate increased loading, such as a dumptruck illustrated in the Figures.

Figure 4:
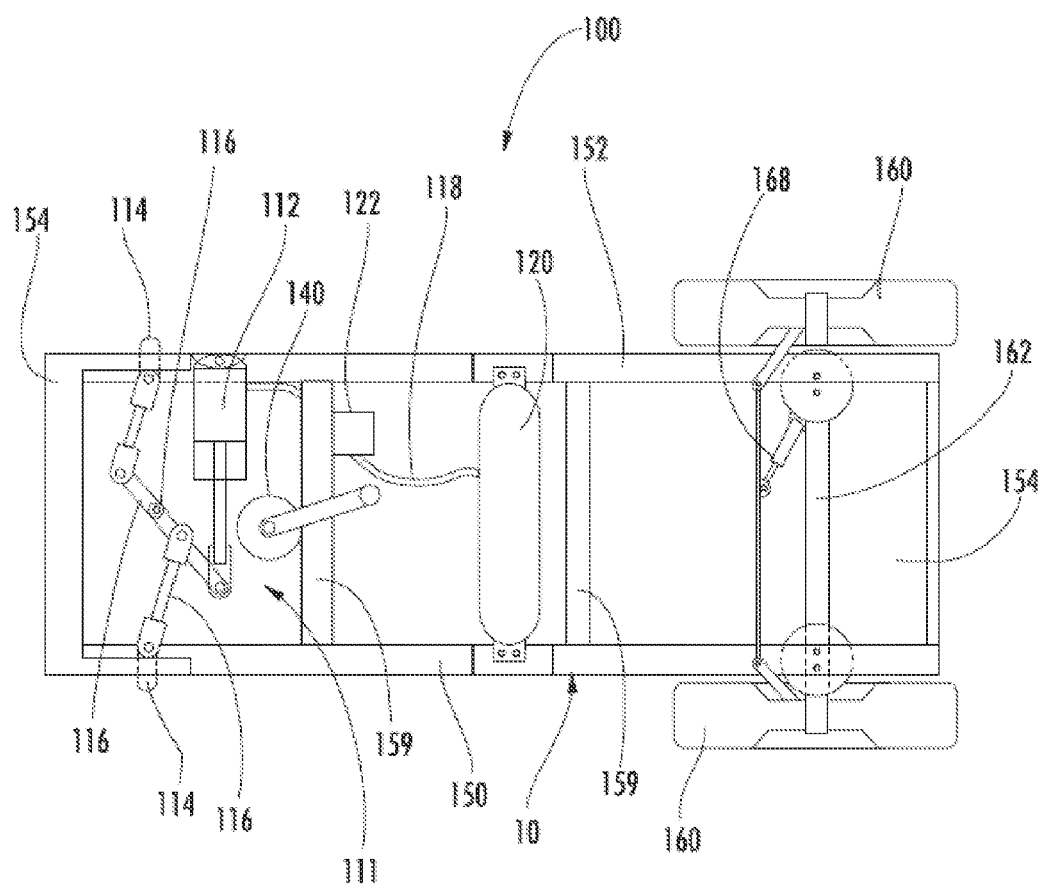
FIG. 4 is a plan view of an exemplary embodiment of a detachable trailing tag axle.

Pin attachment assembly 111, best shown in FIG. 4, may include kinematic pin linkage 116 employed to engage attachment pins 114 through retaining holes in frame 150, and through retaining holes 196 of vehicle 180 when attached to vehicle 180, described in further detail below. Pin attachment assembly 111 may include actuator 112, to engage and disengage pin linkage 116 and pins 114 from connection with vehicle 180. Pin linkage 116 may include a centrally pivoted member pivotally attached off-center to actuator 112, and two secondary links, one pivotally attached by its end at each end of the centrally pivoted member with the other end of each of the secondary links pivotally attached to one attachment pins 114 on opposite lateral sides of frame 150 from each other. Thus when the actuator 112 is actuated it causes pin linkage 116 to move by rotating the centrally pivoted member, which, in turn, pushes or pulls the secondary links, which then move attachment pins 114 to engage or disengage trailing tag axle 100 from vehicle 180.

Pin attachment assembly 111 may be activated by actuator 112 and controlled by valve 122 located in supply line 118 connected to supply tank 120. Supply tank 120 may contain pressurized air to drive actuator 112. Supply tank 120 may be provided compressed air from attachments with vehicle 180 and may be capable of holding enough air to drive actuator 112 through several cycles without replenishment. In some embodiments, supply tank 120 may also be used to drive air brakes in trailing tag axle 100, or multiple supply tanks may be used for pin attachment assembly 111, suspension 168, break systems, either individually, or in combination. In other embodiments, actuator 112 may be a hydraulic actuator driven by hydraulic fluid. The hydraulic fluid may be pumped with a hand-pump, or may be electrically pumped. Similarly, actuator 112 may also be an electric actuator powered with a battery or other power supply, such as power supplied by vehicle 180 through supply lines.

Figure 5:
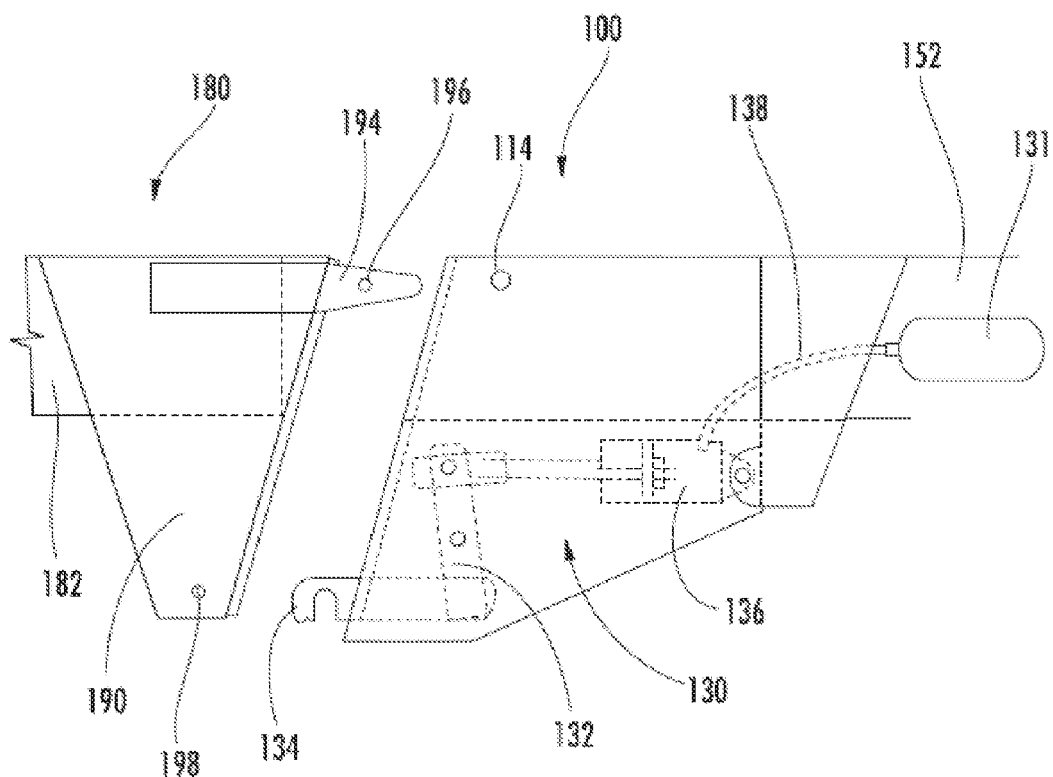
FIG. 5 is a side view of an exemplary embodiment of a detachable trailing tag axle and vehicle attaching and detaching areas in a detached position.
Figure 6:
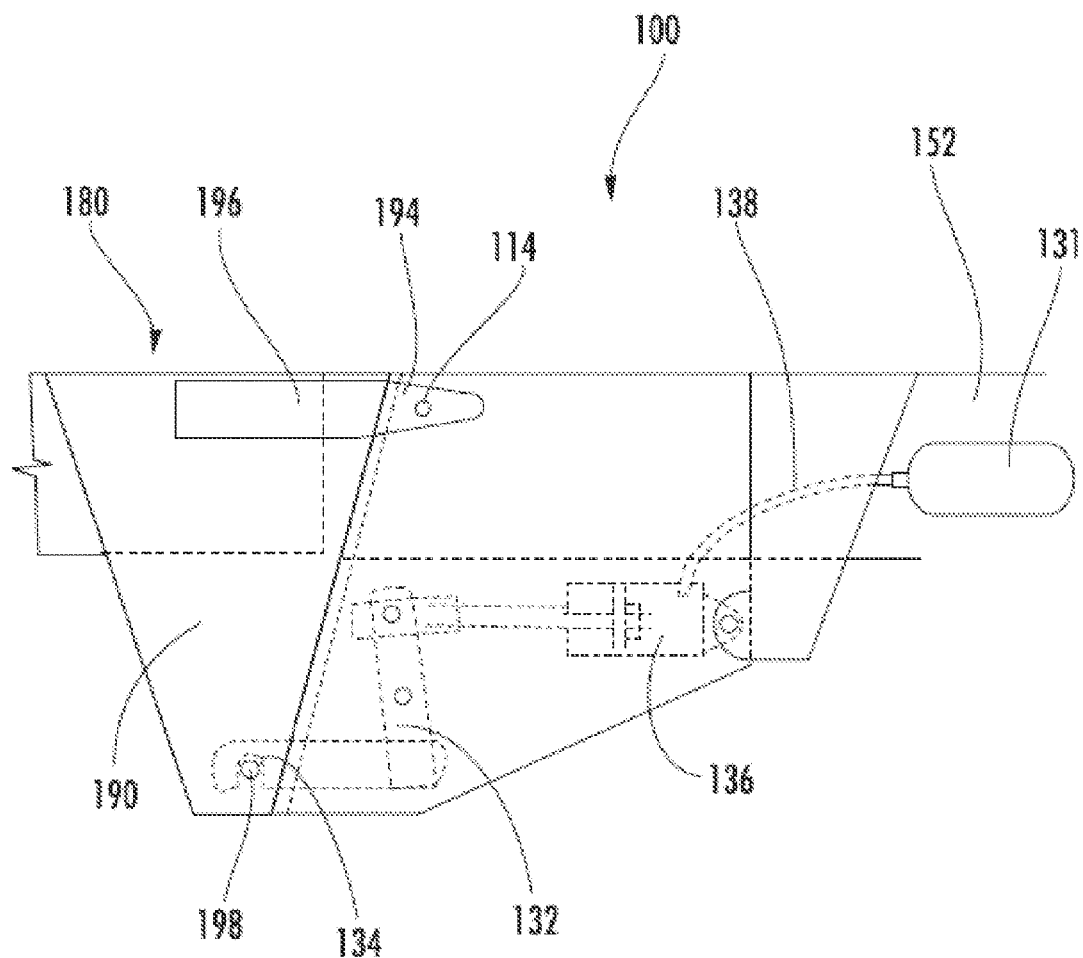
FIG. 6 is a side view of an exemplary embodiment of a detachable trailing tag axle shown in an attached position.

Compensator assembly 130, as best illustrated in FIG. 5, may include kinematic compensator linkage 132, which may be employed to compensate for bumps and dips in the ground and to provide flexibility and safety to trailing tag axle in certain conditions to avoid damage to vehicle 180 or trailing tag assembly 100. Compensator linkage 132 may include latch 134, for attaching to pin 198 on vehicle 180, pivotally attached to one end of compensator a centrally pivoted member of compensator linkage 132. Compensator centrally pivoted member of compensator linkage 132 may then have compensator cylinder 136 pivotally attached to the other end. In some embodiments, compensator linkage 132 may be modified to alter the mechanical ratio of movement between the cylinder and distance achieved between frame 150 and vehicle 180 at pin 198. In other embodiments, compensator linkage may have a single member with latch 134 at one end and extending into cylinder 136 on the other.

A distance between pin 198 and holes 196 may be such that the mechanical advantage of compensator assembly 130 may be optimized for a desired size of compensator assembly 130, depending on the load to be carried, the horizontal distance between axle 162 and attachment pins 114, and the vertical distance between pin 198 and holes 196. In some embodiments the desired load to be carried by trailing tag axle 100 may be pre-selected by adjusting the various mechanical distances and by selecting a compensator assembly 130 of a desired size to accommodate the desired load. For example, in some embodiments, the vertical distance between pin 198 and pin holes 196 may be about 22 inches, the horizontal distance between attachment pins 114 and axle 162 may be about 110 inches, and the compensator assembly may be rated between about 6-7.5 tons.

Cylinder 136 may be a hydraulic cylinder connected to accumulator 131 to maintain a generally constant load required to extend or compress cylinder 136. Accumulator 131 may be any accumulator or similar device used in the industry. For example, accumulator may be a Nitrogen and hydraulic fluid compensator with a fluid line connected to cylinder 136 such that when cylinder 136 extends or compresses, fluid is moved between cylinder 136 and accumulator 131, thereby changing the pressure in the Nitrogen chamber. The compressive or vacuum forces from the Nitrogen chamber maintains force on cylinder 136 to resist movement of cylinder 136 due to movement of trailing tag axle 100 with respect to vehicle 180.

By connecting compensator assembly 130 to vehicle 180, compensator cylinder 136 may then maintain a certain pressure for a given position with the help of accumulator 131 and fluid line 138. In this manner, compensator assembly 130 may allow trailing tag axle 100 and frame 150 to rotate about attachment pins 114 of pin assembly 11, while maintaining the load sharing capabilities of trailing tag axle 100.

For example, if vehicle 180 with attached trailing tag axle 100 were to cross a set of railroad tracks that were raised above the level of the road and therefore had a sudden and steep slope leading up to the tracks, as vehicle 180 moved up the slope to cross the tracks the front wheels would rise with the road to the level of the tracks while the rear wheels stayed at the level of the road. If trailing tag axle 100 were rigidly attached to the vehicle 180 such that it could not pivot about the horizontal axis provided by the attachment of trailing tag axle 100 to vehicle 180 through attachment pins 114, then the front wheels of vehicle 180 and wheels 160 of trailing tag axle 100 would be the only wheels in contact with the road.

This would cause two major problems. First, all the weight of the vehicle 180 including any load in cargo box 184 would be supported by two steering axles. Not only would that be a violation of regulation but it could cause considerable damage to vehicle 180 and the road. Second, the rear wheels of load carrying vehicles 180 are typically the driving wheels. With these wheels off the road vehicle 180 would be unable to move. Compensator assembly 130 does not allow this situation happen because the trailing tag axle 100 is allowed to rotate about attachment pins 114 while still bearing some of the load.

Framework 150 may be formed using rigid members 152 arranged in a longitudinal manner and may be braced laterally with rigid cross members 154. Support jack 140 may be attached to any portion of frame 150, such as rigid cross member 154, such that trailing tag axle 100 may be supported in a position to be attached to vehicle 180. Support jack 140 may be raised and lowered as required for travel, attachment, etc.

Wheels 160 may be attached to axle 162 and to frame 150 through suspension system 168. Suspension system, wheels 160, and axle 162 may be any type an set-up used to support loads with wheels. Other systems, such as brakes, steering, etc. may also be added, as one skilled in the art would understand, to control the wheels 160.

Fixtures, cables, lines and so forth, as well as the appropriate connectors (not shown), may be supplied to allow for connection of trailing tag axle 100 to vehicle 180 through supply lines to control braking, steering, lights, etc.

Vehicle 180 may have a frame 182, and may include cargo box 184 with tailgate 186 to allow for off-loading of a load in vehicle 180. Vehicle 180 may include vehicle connection assembly 190, which may include attachment points, such as horn 194 with holes 196, and pin 198, to facilitate connection to trailing tag axle 100. Horn 194, holes 196, and pin 198, along with any structures necessary to provide components of connection assembly 190 may be attached to frame 182 of vehicle 180. In some embodiments, horn 194 may not be necessary as holes 196 may be located directly in components of frame 182.

Attachment of trailing tag axle 100 to vehicle 180 may be accomplished by backing vehicle 180 up to trailing tag axle 100 such that horn 194 engages trailing tag axle 100 and aligns attachment pins 114 with retaining holes 196. During the backing procedure compensator latch 134 may automatically latch onto pin 198 of vehicle 180. Once vehicle 180 and trialing tag axle 100 are properly aligned, the vehicle operator would then engage the attachment pins 114 by controlling valve 122 to drive actuator 112, thereby moving linkage 116 and engaging attachment pins 114 through retaining holes 196 in vehicle 180 to establish and maintain connection between trailing tag axle 100 and the vehicle 180. The vehicle operator may then connect all necessary and desired supply lines from trailing tag axle 100 to vehicle 180. Support jack 140 may then be raised so that it does not interfere with the operation of vehicle 180 with trailing tag axle 100 attached. With trailing tag axle 100 attached, vehicle 180 can be operated normally with an effectively extended wheelbase.

Figure 7:
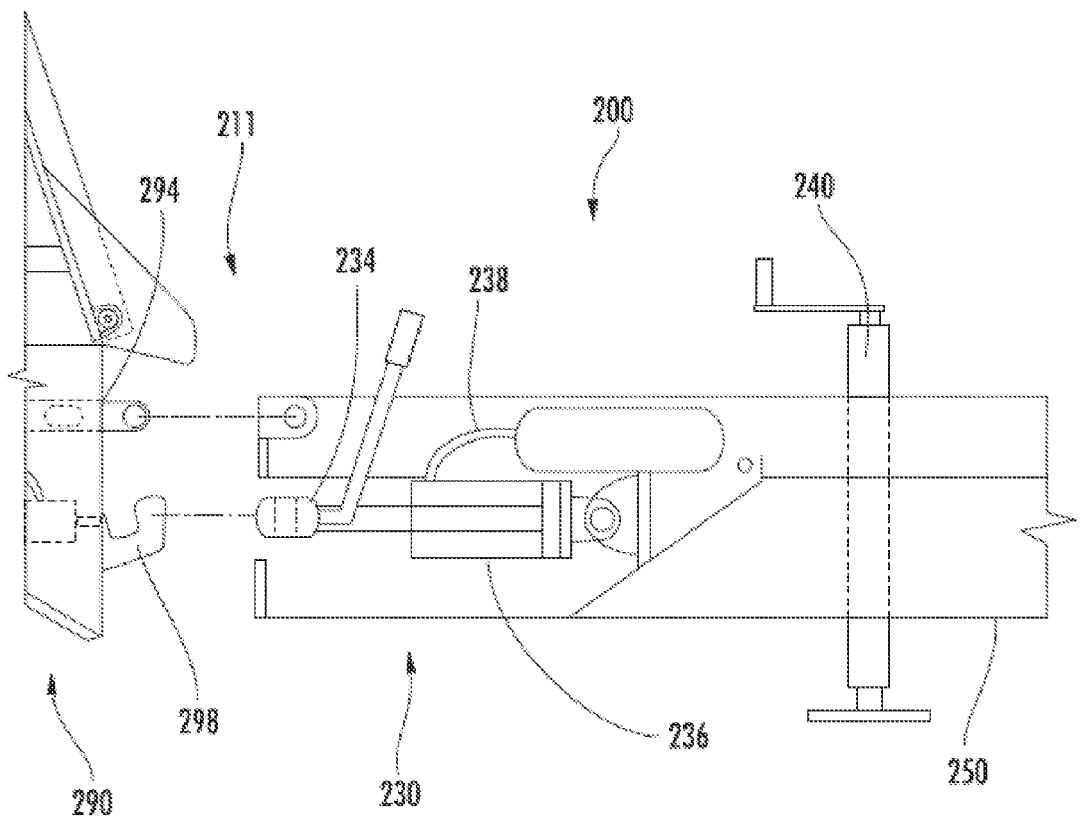
FIG. 7 is a side view of an exemplary embodiment of a detachable trailing tag axle and vehicle attaching a detaching areas in a detached position.

Detachment of the trailing tag axle 100 may be accomplished by finding a suitable spot to park trailing tag axle 100 where it will not interfere with the unloading of vehicle 180. With vehicle 180 securely parked, the vehicle operator may then lower support jack 140, disconnect all supply lines, disengage the attachment pins 114 from retaining holes 196 to disconnect the trailing tag axle 100 from the vehicle 180, and disengage compensator linkage 132. Compensator assembly 130 may be disengaged by lifting compensator latch 134 off of connection with pin 198. A handle, as shown in FIG. 7, may be present to assist in lifting compensator latch 134. It may be necessary to strike compensator latch 134 upwardly with an object such as a piece of wood, mallet, hammer, etc, to disengage compensator assembly 130. In some embodiments, an actuator may be used to lift compensator latch 134. Vehicle 180 may then be driven away from trailing tag axle 100. This procedure may allow the vehicle 180 to move about the load dumping area freely and trailing tag axle 100 will not interfere with the process of disengaging a load.

In another embodiment, as shown in FIG. 7, trailing tag axle 200 may include frame 250, compensator assembly 230, pin assembly 211, and support jack 240. Pin assembly 211 and compensator assembly 230 of trailing tag axle 200 may couple with vehicle 280 through attachment assembly 290. Pin assembly 211 may function similarly to pin assembly 111 as described in reference to trailing tag axle 100. Compensator assembly 230 may include compensator latch 234 and compensator cylinder 236. Compensator cylinder 236 may function similarly to compensator cylinder 136 as described above, attaching to accumulator 231 through supply line 238.

Compensator latch 234 may be shaped and designed such that it works in conjunction with hitch 298 of vehicle 280. Hitch 298 may be of the ring-type conventionally provided on vehicles such as dump trucks, military vehicles, etc. In some embodiments, hitch 298 may be a ball-type hitch with latch 234 being configured to engage hitch 298. The function of compensator assembly 230 is fundamentally similar to that of compensator assembly 130, in the compensator assembly 230 allows frame 250 of trailing tag axle 200 to rotate about the pins of pin assembly 211, when required by road conditions, by allowing cylinder 236 to extend in a generally linear direction, while reducing the number of components, such as compensator linkage 132.

In some embodiments, compensator assembly 230 may also include additional linkage components to alter to the position of components of compensator assembly for convenience, for other components of trailing tag axle 100, or to modify or adjust the mechanical leverage and ratio of movement between compensator latch 234 and cylinder 236.

The structures on detachable trailing tag axle 100, 200 typically accomplish five basic functions. They increase the overall length of the vehicle 180, 280 to legally accommodate larger loads, support some of the load on the ground, attach and detach from vehicle 180, 280, compensate for bumps and dips, and shock absorb, brake, and steer in a manner familiar to one skilled in the art. For example, when detachable trailing tag axle 100, 200 is attached to vehicle 180, 280, the length of frame 150, 250 from the front of trailing tag axle 100, 200 to the center of wheels 160 increases the total length of vehicle 180, 280, thus legally providing for heavier loads to be carried. Also, pin assembly 111, 211 and compensator assembly 130, 230 allow for easy attachment and detachment of trailing tag axle 100, 200 from vehicle 180, 280, thus not impeding tailgate 186 or the load disengaging capabilities of vehicle 180, 280. Compensator assembly 130, 230, including compensator linkage 132, compensator latch 134, 234, and cylinder 136, 236 along with accumulator 131, 231 allow trailing tag axle 100, 200 to conform to bumps and dips in the ground without damaging frame 150, 250 or vehicle 180, 280 while still distributing a load carried by vehicle 180, 280 throughout all of the axles, including axle 162 of trailing tag axle 100.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

What is claimed is:

1. A device, comprising:
    a frame;
    an axle coupled to the frame;
    a first attachment assembly coupled to the frame, wherein the first attachment assembly is configured to releasably and pivotably mount about a horizontal axis the frame to a vehicle; and
    a second attachment assembly coupled to the frame, wherein the second attachment assembly is configured to be releasably mounted to the vehicle such that at least a portion of the second attachment assembly is configured move generally linearly with respect to the vehicle when mounted to the vehicle, the device being configured to be selectively attached to or entirely detached from the vehicle using the first and second attachment assemblies.

2. The device of claim 1, wherein the device is configured to be mounted to the vehicle such that it extends the effective load-bearing wheelbase of the vehicle.

3. The device of claim 1, wherein the first attachment assembly includes at least two connection points.

4. The device of claim 3, wherein at least two connection points are pins extending through corresponding holes in a portion of the vehicle.

5. The device of claim 4, wherein the corresponding holes are located in a vehicle frame of the vehicle.

6. The device of claim 4, wherein the first attachment assembly is configured to be released from the vehicle with a single actuator.

7. The device of claim 6, wherein the single actuator is one of a hydraulic and an electric actuator.

8. The device of claim 1, wherein the second attachment assembly includes a hydraulic compensator configured to allow a portion of the device to pivot away from the vehicle while the device continues to bear a portion of a load on the vehicle.

9. The device of claim 8, wherein the second attachment assembly is configured such that the load that the device will bear may be adjusted.

10. The device of claim 1, wherein the second attachment assembly includes a latch configured to engage a receiving portion of the vehicle.

11. The device of claim 1, wherein the receiving portion of the vehicle is a standard trailering mount.

12. The device of claim 1, further comprising at least two wheels coupled to the axle and a steering mechanism configured to steer the at least two wheels.

13. The device of claim 1, further comprising suspension coupled to the axle and to the frame.

14. A method, comprising:
    attaching a tag axle to a vehicle such that the tag axle is configured to pivot with respect to the vehicle only about a horizontal axis;
    moving the vehicle to a desired off-load site;
    detaching the tag axle from the vehicle such that the tag axle is no longer in contact with any portion of the vehicle;
    unloading the vehicle; and
    reattaching the tag axle to the vehicle.

15. The method of claim 14, wherein the attaching the tag axle includes engaging at least one pin through at least one passageway between a frame of the tag axle and a frame of the vehicle.

16. The method of claim 14, wherein the attaching the tag axle and the reattaching the tag axle include at least coupling the tag axle to the vehicle with a compensator assembly configured to provide resistance to the tag axle pivoting such that the tag axle supports at least a portion of a load carried by the vehicle.

17. The method of claim 14, wherein the removing the tag axle includes disengaging at least one pin connecting the tag axle and the vehicle with a single actuator, such that disengaging the at least one pin effectively uncouples the tag axle and the vehicle.

18. The method of claim 14, wherein the tag axle includes a suspension separate from any mechanism used to attach the tag axle to the vehicle.

19. The method of claim 14, further comprising, operating a jack stand to support a portion of the tag axle while the tag axle is detached from the vehicle.

20. The device of claim 1, further comprising a jack stand configured to contact the ground to support a portion of weight of the frame when the frame is detached from the vehicle.

* * * * *